United States Patent [19]

Preiser et al.

[11] Patent Number: 5,350,089
[45] Date of Patent: Sep. 27, 1994

[54] FEEDER FOR DISPENSING FLOWABLE SUBSTANCES

[75] Inventors: Friedrich W. Preiser, Sewell, N.J.; Kenneth W. Bullivant, Chadds Ford, Pa.; Marcel Peyer, Waltenschwil, Switzerland

[73] Assignee: K-Tron Technologies, Inc., Wilmington, Del.

[21] Appl. No.: 55,729

[22] Filed: Apr. 30, 1993

[51] Int. Cl.⁵ .................... G01F 11/20; B25G 3/08; F16B 7/00; F16D 1/00

[52] U.S. Cl. .................... 222/413; 403/327; 403/377; 403/383

[58] Field of Search .................... 222/411–413, 222/236–242; 403/326, 327, 377, 383; 285/321

[56] References Cited

U.S. PATENT DOCUMENTS

| | | | |
|---|---|---|---|
| 1,134,179 | 4/1915 | Boyd | 403/383 X |
| 1,442,223 | 1/1923 | Knebusch | 403/326 |
| 3,347,293 | 10/1967 | Clark | 403/326 X |
| 4,142,543 | 3/1979 | Krause et al. | 403/326 X |
| 4,586,845 | 5/1986 | Morris | 403/383 X |
| 4,615,402 | 10/1986 | Eisenloeffel | 403/327 X |
| 4,781,487 | 11/1988 | Greco | 403/326 |
| 5,170,914 | 12/1992 | Shalit | 222/413 |

FOREIGN PATENT DOCUMENTS 1341967  9/1963  France ............... 403/383

Primary Examiner—Andres Kashnikow
Assistant Examiner—Kenneth DeRosa
Attorney, Agent, or Firm—Ratner & Prestia

[57] ABSTRACT

A feeder for dispensing flowable substances and a coupling which causes rotation of the feed screw of the feeder in response to the drive system of the feeder. The feed screw is removable from the feeder, with insertion and removal of the feed screw effected by only axial movement of the feed screw. A torque transmitting member, connected to the drive system, and a torque receiving member, from which the feed screw extends, have complementary non-circular mating surfaces through which the torque from the drive system is imparted to the feed screw. Unintended axial movement of the feed screw is prevented by a locking arrangement between the torque transmitting member and the torque receiving member. The torque transmitting member has a pilot portion which facilitates insertion of the feed screw in the feeder and provides guidance of the feed screw during operation.

19 Claims, 2 Drawing Sheets

FEEDER FOR DISPENSING FLOWABLE SUBSTANCES

TECHNICAL FIELD

The present invention relates, in general, to equipment for dispensing flowable substances, commonly referred to as "feeders," and in particular, to a coupling unit for a feeder for imparting torque from a drive system to a feed screw by which the flowable substances are delivered to a dispensing opening.

BACKGROUND OF THE INVENTION

The feed screw in feeders which dispense flowable substances (e.g. powders, pellets, granules, fibers and flakes) is driven to rotate by a motor and suitable gearing and the like. As the flowable substance is discharged to the feed screw from a storage hopper positioned above the feed screw, the helical arrangement of the feed screw advances the flowable substance to a dispensing opening at the end of a trough in which the feed screw is positioned.

The torque imparted to the feed screw must be adequate to advance the load of flowable substance dropped into the trough to the dispensing opening. Also, this torque should be sufficient to overcome a jammed condition of the flowable substance.

In addition, the feeder should be arranged for easy insertion and removal of the feed screw, so that different feed screws can be used for handling different flowable substances. The feed screws also are removed for cleaning either as a routine matter or when switching use of the feeder from one flowable substance to another.

A further requirement, tied to the feature of removability of the feed screw, is that the feed screw be retained against unintended axial movement of the feed screw caused, for example, by its own weight when the feeder is set with the feed screw disposed at an angle below horizontal. It is necessary to optimize between adequate retention against unintended axial movement of the feed screw and the facility of relatively easy axial movement for insertion and removal of the feed screw. Also, the feeder, preferably, is arranged, so that the individual who inserts the feed screw receives a signal that the feed screw has, in fact, been inserted properly.

A common use of feeders is to handle certain flowable substances under extremely high sanitary conditions. Under such circumstances, the feeder parts contacted by the flowable substance or those feeder parts to which the flowable substance can migrate should be free of blind cracks or crevices in which the flowable substance can collect.

Among the arrangements used previously to couple a feed screw to a drive system is a threaded connection. The driven end of the feed screw has a thread running in a direction opposite from the helix of the feed screw. The threaded connection makes possible the insertion and removal of the feed screw. There ares however, certain shortcomings of such threaded connections. Often, it is very difficult to remove the feed screw because the feed screw threaded end is jammed against its mating thread during operation of the feeder, so that the break loose torque is high. In certain feeders having the feed screws connected to the drive system by a threaded connection, the drive motor or some other part in the drive system must be provided with a brake which opposes the tendency for rotation as the feed screw is turned for removal. Another shortcoming of such threaded connections is the difficulty of insertion and removal of multiple feed screws. Typically, the feed screws are positioned in such close proximity to another that the helix of one fits within the helix of another. Thus, great care must be taken and much time is required to insert or remove the feed screws without movement of one obstructing movement of the other.

Bayonet arrangements also have been used previously to couple a feed screw to a drive system. For insertion, the feed screw first is moved axially and then it is turned 90° to lock the feed screw in place. For removals the feed screw first is turned 90° in the opposite direction to release the feed screw and when it is moved axially. Bayonet arrangements also suffer from certain shortcomings. One is that they are expensive to fabricate because they require precise machining operations to produce mating surfaces which can accommodate the axial and rotational relative movements. Another shortcoming of bayonet arrangements is weakening of the parts because of the required configurations resulting in either reduced load carrying capability or fabricating larger parts which can handle the expected loads. A third shortcoming of bayonet arrangements is the distinct possibility of collection of the flowable substance in blind cracks or crevices. With bayonet arrangements involving a turning movement as part of the insertion or removal operation, there can be a certain amount of difficulty in the insertion or removal of multiple feed screws but to a lesser extent than with threaded connections because the bayonet arrangement requires only a single 90° movement, whereas the threaded connection requires multiple 360° turns.

Male and female mating parts having complementary polygonal mating surfaces also have been used previously to couple a feed screw to a drive system. Such arrangements also suffer from certain shortcomings. First, because of the difficulty in forming a recess for the particular cross-sectional shapes selected, the depth of the recess is limited, resulting in limited axial support and stability for the feed screw. Second, in order to provide axial retention against unintended axial movement of the feed screw, a long screw, extending through a long bore in either the feed screw or the drive shaft for the feed screw was provided for engagement with the other part. Third, with non-circular mating part, alignment for insertion is difficult.

SUMMARY OF THE INVENTION

Accordingly, a feeder for controllably dispensing a flowable substance, constructed in accordance with the present invention, includes storage means for holding a flowable substance and having a discharge opening through which the flowable substance is discharged and a trough positioned to receive the flowable substance discharged from storage means and having a dispensing opening. Also included in the present invention are a rotatable feed screw positioned in the trough for advancing the flowable substance discharged from the storage means along the trough to the dispensing opening drive means for providing torque to rotate the feed screw. The present invention further includes coupling means for imparting torque from the drive means to the feed screw. The coupling means include a torque transmitting member connected at a first end to the drive means and having (a) a cylindrical pilot portion at a second end of the torque transmitting member opposite from the first end of the torque transmitting member, (b) a locking member in the pilot portion and radially movable to project radially outward of the pilot portion, and (3) a drive transmitting portion of non-circular cross-section. The coupling means also include a torque receiving member having a first end from which the feed screw extends and an axial bore extending from a second end of the torque receiving member opposite from the first end of the torque receiving member. The axial bore of the torque receiving member has (a) a drive receiving portion of non-circular cross-section complementary to the non-circular cross-section of the drive transmitting portion of the torque transmitting member and within which the drive transmitting portion is fitted, and (2) a cylindrical pilot receiving portion, inward of the drive receiving portion, within which the pilot portion of the torque transmitting member is fitted and having a recess for receiving the locking member of torque transmitting member upon radially outward movement of the locking member.

DETAILED DESCRIPTION OF THE INVENTION

Figure 1:
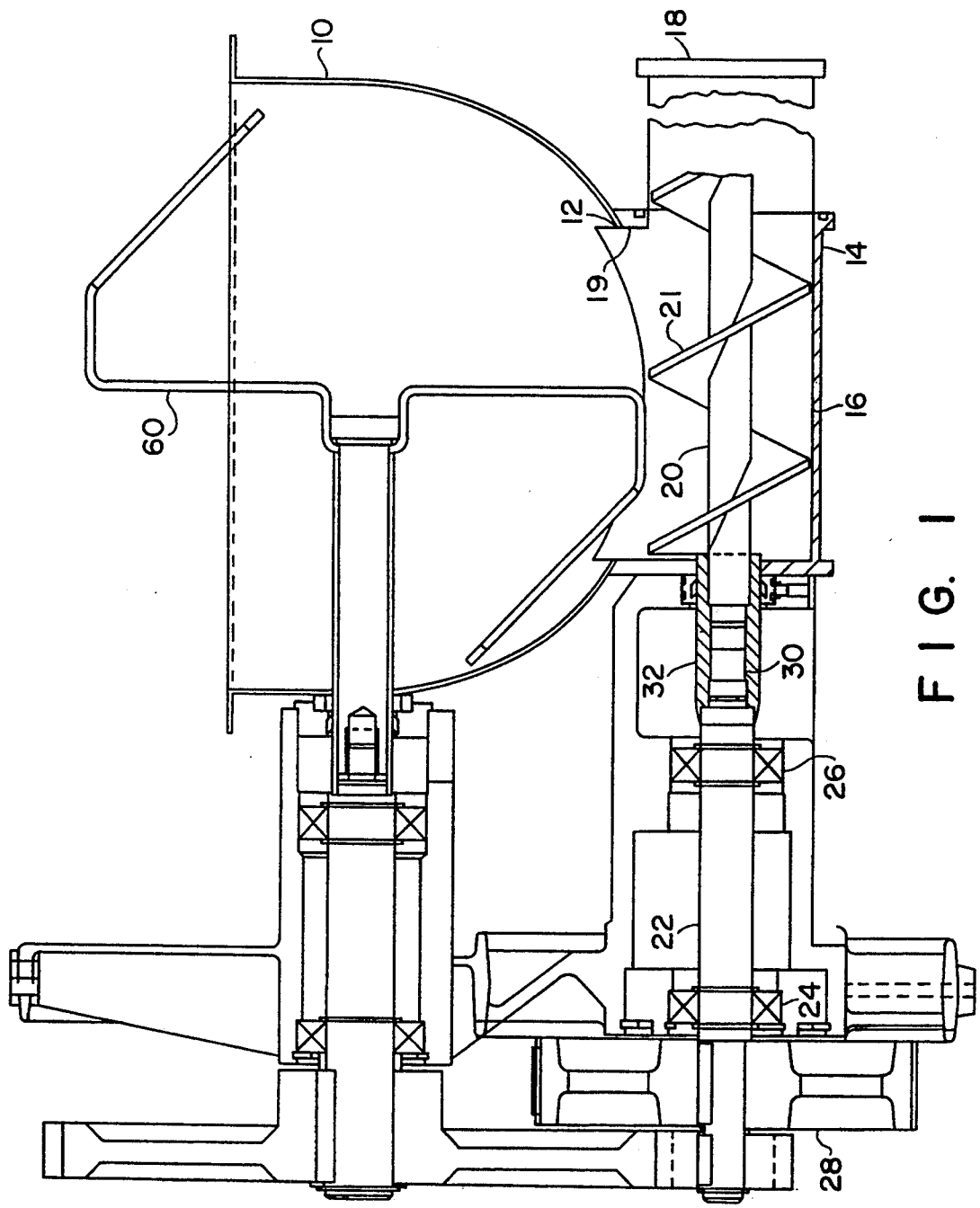
FIG. 1 is a sectional side view of a feeder constructed in accordance with the present invention.

Referring to FIG. 1, a feeder for controllably dispensing a flowable substance; constructed in accordance with the present invention, includes storage means for holding a flowable substance. For the embodiment of the invention being described, such storage means include a hopper 10 having a lower portion of hemispherical shape and an upper portion which extends vertically upwards from the hemispherical lower portion. Hopper 10 has a discharge opening 12 through which flowable substance is discharged from the hopper.

A feeder for controllably dispensing a flowable substance, constructed in accordance with the present invention, also includes a trough 14 positioned to receive flowable substance discharged from hopper 10 through discharge opening 12. Trough 14, positioned beneath discharge opening 12 of hopper 10, has a channel 16 extending along the length of the trough and a dispensing opening 18 at one end of the channel through which flowable substance is dispensed. Preferably, trough 14 also has an upwardly extending chute 19 which passes through discharge opening 12 of hopper 10 to assure that all of the flowable substance discharged from the hopper falls into the trough.

A feeder for controllably dispensing a flowable substance, constructed in accordance with the present invention, also includes a rotatable feed screw 20 positioned in trough 14 for advancing flowable substance discharged from hopper 10 through channel 16 along the through to dispensing opening 18, As feed screw 20 rotates, the helix 21 of the feed screw advances flowable substance deposited in channel 16 to dispensing opening 18.

A feeder for controllably dispensing a flowable substance, constructed in accordance with the present invention, also includes drive means for providing torque to rotate feed screw 20. Such drive means include, for the embodiment of the invention being described, a drive shaft 22 mounted for rotation in a pair of bearings 24 and 26, a gear 28 mounted on drive shaft 22, and a motor (not shown) having its output shaft coupled to gear 28 in a suitable manner.

A feeder for controllably dispensing a flowable substance, constructed in accordance with the present inventions also includes coupling means for imparting torque from the drive means to feed screw 20. The coupling means include a torque transmitting member 30 connected at a first end to the drive means and a torque receiving member 32 having a first end from which feed screw 20 extends. Torque transmitting member 30 and torque receiving member 32 are arranged for the torque transmitting member to fit within the torque receiving member.

Figure 2A:
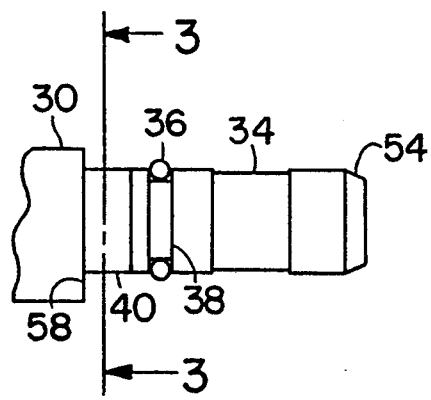
FIG. 2A is a side view of the torque transmitting member of the FIG. 1 feeder.
Figure 3:
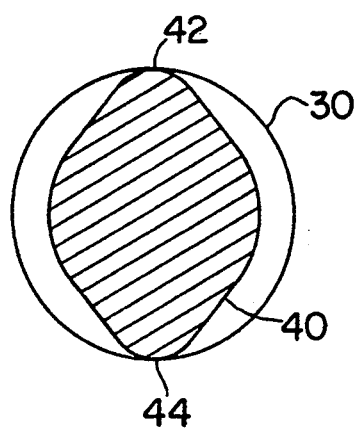
FIG. 3 is a sectional view of the torque transmitting member of FIG. 2A taken along line 3—3 of FIG. 2.

Referring to FIGS. 2A and 3, which show torque transmitting member 30 on an enlarged scale, the torque transmitting member has a cylindrical pilot portion 34 at a second end of torque transmitting member 30 opposite from the first end of the torque transmitting member which is connected to the drive means. For the embodiment of the invention being described, torque transmitting member 30 and drive shaft 22 are a unitary piece which is machined into the desired configuration or cast into the generally desired configuration followed by machining. Alternatively, torque transmitting member 30 and drive shaft 22 can be separate parts connected together by suitable means.

Torque transmitting member 30 also has a locking member 36 in the form of a compressible split ring spring carried in a groove 38 in pilot portion 34. Split ring spring 36 is radially compressible and radially expandable to project radially outward of pilot portion 34.

Torque transmitting member 30 also has a drive transmitting portion 40 of non-circular cross-section. For the embodiment of the invention being described, drive transmitting portion 40 has a generally oval-shaped cross-section with two oppositely disposed lobed ends 42 and 44.

Figure 2B:
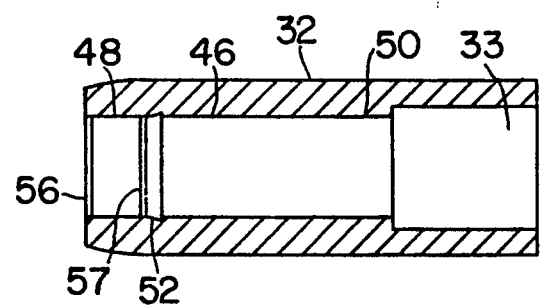
FIG. 2B is a sectional side view of the torque receiving member of the FIG. 1 feeder.
Figure 4:
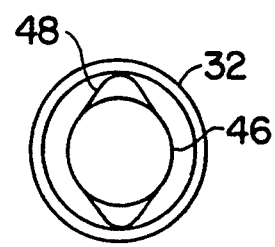
FIG. 4 is an end view from the left end of the torque receiving member of FIG. 2B.

Referring to FIGS. 2B and 4, which show torque receiving member 32 on an enlarged scale, the torque receiving member has an axial bore 46 extending from a second end of the torque receiving member opposite from the first end of the torque receiving member from which feed screw 20 extends. For the embodiment of the invention being described, torque receiving member 32 and feed screw 20 are separate parts connected together by suitable means. Feed screw 20, not shown in FIG. 2B, can be arranged with an end shaped and sized to fit into a portion 33 of axial bore 46 and then the two parts can be welded together. Alternatively, torque receiving member 32 and feed screw 20 can be a unitary piece which is machined into the desired configuration or cast into the generally desired configuration followed by machining.

Axial bore 46 in torque receiving member 32 has a drive receiving portion 48 of non-circular cross-section complementary to non-circular cross-section of drive transmitting portion 40 of torque transmitting member 30 and within which drive transmitting portion is fitted. FIGS. 2A and 2B show torque transmitting member 30 and torque receiving member 32, respectively, aligned axially prior to the torque transmitting member being fitted within the torque receiving member.

Axial bore 46 in torque receiving member 32 also has a cylindrical pilot receiving portion 50, inward of drive receiving portion 48, within which pilot portion 34 of torque transmitting member 30 is fitted. Pilot receiving portion 50 has a recess 52, in the form of a groove, for receiving split ring spring 36 upon radially outward expansion of the split ring spring.

Feed screw 20 is inserted into the feeder by axial movement of the feed screw with pilot portion 34 of torque transmitting member 30 first entering axial bore 46 of torque receiving member 32. Preferably, the point end 54 of torque transmitting member 30 is angled and the opening 56 of axial bore 46 is chamfered to facilitate entry of the torque transmitting member into the torque receiving member. As a results pilot portion 34, having a circular cross-section, is guided into axial bore 46, having a generally oval shape at its opening with a minor diameter equal to the diameter of the pilot portion and a major diameter somewhat greater than the diameter of the pilot portion.

Further axial movement of the feed screw causes radial compression of split ring spring 36 into groove 38 which carries the split ring spring because the minor diameter of drive receiving portion 48 of axial bore 46 is less than the outside diameter of the split ring spring in its uncompressed state. Split ring spring 36 remains compressed until it clears drive receiving portion 48 of axial bore 46 at which time drive transmitting portion 40 of torque transmitting member 30 has entered drive receiving portion 48 of axial bore 46 and the split ring spring expands radially into groove 52 in pilot receiving portion 50 of the axial bore. Pilot portion 34 facilitates entry of non-circular drive transmitting portion 40 into non-circular drive receiving portion 48. Once pilot portion 34 has entered axial bore 46, drive transmitting portion 40 will follow and all that is required for entry of drive transmitting portion 40 into drive receiving portion 48 is turning of the feed screw to bring the drive transmitting portion and the drive receiving portion into proper alignment. Preferably, chamfered opening 56 of axial bore 46 extends into the lobed ends drive receiving portion 48 which receive lobed ends 42 and 44 of drive receiving portion 48. Preferably, the bottom 57 of drive receiving portion 48 has a radius which provides a lead into pilot receiving portion 50 for pilot portion 34.

Once the feed screw has been properly inserted, torque from the drive means which are connected to torque transmitting member 30 is coupled to the feed screw which is connected to the torque receiving member 32 through the engagement of the non-circular drive transmitting portion 40 with the non-circular drive receiving portion 48. With pilot portion 34 of torque transmitting member 30 fitted within pilot receiving portion 50 of axial bore 46, the feed screw axial alignment is maintained by the bearing between pilot portion 34 and pilot receiving portion 50 either throughout the entire length of pilot portion 34 or only at two spaced regions as shown in FIG. 1.

Removal of the feed screw from the feeder is simply the reverse of the insertion operation just described. Axial movement of torque receiving member 32 away from torque transmitting member 30 starts with radial compression of split ring spring 36 into groove 38 in which the split ring spring is carried. Split ring spring 36 remains compressed until it clears drive receiving portion 48 of axial bore 46 at which time torque transmitting member 30 and torque receiving member 32 can be separated completely as shown by FIGS. 2A and 2B.

Thus, insertion of the feed screw into the feeder and removal of the feed screw from the feeder is relatively easy. The only force required for insertion and removal of the feed screw is that which is necessary to cause radial compression of split ring spring 36. The required force, however, is great enough to prevent unintended axial movement of the feed screw, such as tends to occur due to the weight of the feed screw itself when the feed screw is disposed at an angle below the horizontal.

Proper insertion of the feed screw in the feeder is indicated by abutment of the leading end of torque receiving member 32 against a shoulder 58 on torque transmitting member 30 axially inward of drive transmitting portion 40, Shoulder 58 serves to take up the thrust of torque receiving member 32, with the feed screw attached, caused by the load of flowable substance being moved by the feed screw. Besides "feeling" the proper insertion into the feeder of the feed screw, one can also hear the sound produced by the leading end of torque receiving member 32 abutting against shoulder 58 on torque transmitting member 30. At the same time, split ring spring 36 snaps into groove 52 of axial bore 46 making a clicking sound which contributes to the sound signalling that the feed screw has been properly inserted.

Although the present invention has been described in connection with a single feed screw feeder, it will be apparent to those skilled in the art that the present invention is particularly useful with multiple feed screw feeders. Because the insertion and removal of the feed screws involves only axial movement of the feed screws, without any turning movement, two or more feed screws can be inserted into or removed from the feeder with the helix of one feed screw obstructing the insertion or removal of another feed screw.

Yet another feature of the present invention is that there are no blind cracks or crevices in which a flowable substance being handled by the feeder can collect. With the feed screw inserted, the coupling means, namely torque transmitting member 30 and torque receiving member 32, are isolated from flowable substances by a seal 59 surrounding the torque receiving member as shown in FIG. 1. When the feed screw is being removed and passes under discharge opening 12 of hopper 10, flowable substances can collect in bore 46. However, as is apparent from FIG. 2B, axial bore 46 has no blind crevices, even when closed off at the end from which the feed screw extends. Any flowable substance collecting in axial bore 46 can, therefore, be easily flushed out.

In order to keep the flowable substance stored in hopper 10 free-flowing and away from the sides of the hopper, as shown in FIG. 1, an agitator 60 may be provided. Agitator 60 rotates and disturbs the flowable substance within hopper 10 and the flowable substance tending to cling to the sides of the hopper. Agitator 60 is connected to a drive which imparts rotary movement to the agitator about a horizontal axis. For the embodiment of the invention being described, agitator 60 is coupled to the same drive motor which causes rotation of feed screw 20 by suitable means.

While there has been described a preferred embodiment of the present invention, it will be apparent to those skilled in the art that various modifications may be made without departing from the true spirit and scope of the invention.

What is claimed:

1. A feeder for controllably dispensing a flowable substance comprising:
   storage means for holding a flowable substance and having a discharge opening through which said flowable substance is discharged;
   a trough positioned to receive said flowable substance discharged from said storage means and having a dispensing opening;
   a rotatable feed screw positioned in said trough for advancing said flowable substance discharged from said storage means along said trough to said dispensing opening ;
   drive means for providing torque to rotate said feed screw;
   and coupling means for imparting torque from said drive means to said feed screw, said coupling means including:
   (a) a torque transmitting member connected at a first end to said drive means and having:
      (1) a cylindrical pilot portion at a second end of said torque transmitting member opposite from said first end of said torque transmitting member,
      (2) a locking member in said pilot portion and radially movable to project radially outward of said pilot portion, and
      (3) a drive transmitting portion of non-circular cross-section, and
   (b) a torque receiving member having a first end from which said feed screw extends and an axial bore extending from a second end of said torque receiving member opposite from said first end of said torque receiving member, said axial bore having:
      (1) a drive receiving portion of non-circular cross-section complementary to said non-circular cross-section of said drive transmitting portion of said torque transmitting member and within which said drive transmitting portion is fitted, and
      (2) a cylindrical pilot receiving portion, inward of said drive receiving portion, within which said pilot portion of said torque transmitting member is fitted and having a recess for receiving said locking member of torque transmitting member upon radially outward movement of said locking member.

2. A feeder according to claim 1 wherein said pilot portion of said torque transmitting member has a groove and said pilot receiving portion of said axial bore of said torque receiving member has a groove and said locking member is a radially compressible and radially expandable split ring spring which is carried in said groove in said pilot portion and which expands radially outward into said groove in said pilot receiving portion.

3. A feeder according to claim 2 wherein each of said non-circular cross-section of said drive transmitting portion of said torque transmitting member and said non-circular cross-section of said drive receiving portion of said axial bore of said torque receiving member is generally oval-shaped.

4. A feeder according to claim 3 wherein each of said generally oval-shaped cross-section of said drive transmitting portion of said torque transmitting member and said generally oval-shaped cross-section of said drive receiving portion of said axial bore of said torque receiving member has oppositely disposed lobed ends.

5. A feeder according to claim 2 wherein said drive means include a drive shaft and said drive shaft and said torque transmitting member are a unitary piece.

6. A feeder according to claim 2 wherein said feed screw and said torque receiving member are separate pieces which are connected together.

7. A feeder according to claim 4 wherein said pilot portion of said torque transmitting member has an angled point end and said axial bore of said torque receiving member has a chamfered opening.

8. A feeder according to claim 7 wherein said drive receiving portion of said axial bore of said torque receiving member has a radiused bottom.

9. A feeder according to claim 7 wherein said pilot portion of said torque transmitting member bears against said pilot receiving portion of said axial bore of said torque receiving member at two spaced regions.

10. A feeder according to claim 4 wherein said torque transmitting member has a shoulder axially inward of said drive transmitting portion against which said torque receiving member abuts.

11. A coupling unit for imparting torque from a drive system to a feed screw comprising:
   a torque transmitting member adapted at a first end for connection to a drive system and having:
   (a) a cylindrical pilot portion at a second end of said torque transmitting member opposite from said first end of said torque transmitting member,
   (b) a locking member in said pilot portion and radially movable to project radially outward of said pilot portion, and
   (c) a drive transmitting portion of non-circular cross-section,
   and a torque receiving member having a first end from which a feed screw extends and an axial bore extending from a second end of said torque receiving member opposite from said first end of said torque receiving member, said axial bore having:
   (a) a drive receiving portion of non-circular cross-section complementary to said non-circular cross-section of said drive transmitting portion of said torque transmitting member and within which said drive transmitting portion is fitted, and
   (b) a cylindrical pilot receiving portion, inward of said drive receiving portion, within which said pilot portion of said torque transmitting member is fitted and having a recess for receiving said locking member of torque transmitting member upon radially outward movement of said locking member.

12. A coupling unit according to claim 11 wherein said pilot portion of said torque transmitting member has a groove and said pilot receiving portion of said axial bore of said torque receiving member has a groove and said locking member is a radially compressible and radially expandable split ring spring which is carried in said groove in said pilot portion and which expands radially outward into said groove in said pilot receiving portion.

13. A coupling unit according to claim 12 wherein each of said non-circular cross-section of said drive transmitting portion of said torque transmitting member and said non-circular cross-section of said drive receiving portion of said axial bore of said torque receiving member is generally oval-shaped.

14. A coupling unit according to claim 13 wherein each of said generally oval-shaped cross-section of said drive transmitting portion of said torque transmitting member and said generally oval-shaped cross-section of said drive receiving portion of said axial bore of said torque receiving member has oppositely disposed lobed ends.

15. A coupling unit according to claim 14 wherein said pilot portion of said torque transmitting member has an angled point end and said axial bore of said torque receiving member has a chamfered opening, 16. A coupling unit according to claim 15 wherein said drive receiving portion of said axial bore of said torque receiving member has a radiused bottom.

17. A coupling unit according to claim 16 wherein said pilot portion of said torque transmitting member bears against said pilot receiving portion of said axial bore of said torque receiving member at two spaced regions.

18. A coupling unit according to claim 14 wherein said torque transmitting member has a shoulder inward of said drive transmitting portion against which said torque receiving member abuts.

19. A feeder according to claim 1 further including means for disturbing flowable substance within said storage means.

* * * * *